US010792851B2

(12) United States Patent
Sun et al.

(10) Patent No.: US 10,792,851 B2
(45) Date of Patent: Oct. 6, 2020

(54) POLYMERIC MATERIAL FOR CONTAINER

(71) Applicant: Berry Plastics Corporation, Evansville, IN (US)

(72) Inventors: David Dezhou Sun, Evansville, IN (US); Philip A. Driskill, Newburgh, IN (US); Rolland Strasser, Hamden, CT (US)

(73) Assignee: Berry Plastics Corporation, Evansville, IN (US)

( * ) Notice: Subject to any disclaimer, the term of this patent is extended or adjusted under 35 U.S.C. 154(b) by 236 days.

(21) Appl. No.: 15/713,799

(22) Filed: Sep. 25, 2017

(65) Prior Publication Data

US 2018/0009153 A1 Jan. 11, 2018

Related U.S. Application Data

(63) Continuation of application No. 14/468,789, filed on Aug. 26, 2014, now Pat. No. 9,931,781.

(60) Provisional application No. 61/869,928, filed on Aug. 26, 2013.

(51) Int. Cl.
| | |
|---|---|
| *B29C 49/22* | (2006.01) |
| *B29C 49/00* | (2006.01) |
| *B29C 49/04* | (2006.01) |
| *B29C 44/22* | (2006.01) |
| *B65D 81/38* | (2006.01) |
| *B29K 23/00* | (2006.01) |
| *B29K 105/00* | (2006.01) |
| *B29K 105/04* | (2006.01) |
| *B29L 31/00* | (2006.01) |
| *B29L 9/00* | (2006.01) |

(52) U.S. Cl.
CPC .............. *B29C 49/22* (2013.01); *B29C 44/22* (2013.01); *B29C 49/0005* (2013.01); *B29C 49/04* (2013.01); *B65D 81/3846* (2013.01); *B29K 2023/12* (2013.01); *B29K 2023/14* (2013.01); *B29K 2105/043* (2013.01); *B29K 2105/258* (2013.01); *B29K 2995/0015* (2013.01); *B29K 2995/0063* (2013.01); *B29L 2009/00* (2013.01); *B29L 2031/712* (2013.01)

(58) Field of Classification Search
CPC ...................................................... B29C 49/22
See application file for complete search history.

(56) References Cited

U.S. PATENT DOCUMENTS

| | | | |
|---|---|---|---|
| 7,183,005 | B2 | 2/2007 | Poloso |
| 9,937,652 | B2 | 4/2018 | Sun |
| 2003/0151172 | A1 | 8/2003 | Floyd |
| 2003/0211350 | A1 | 11/2003 | Migliorini |
| 2010/0279046 | A1 | 11/2010 | Ashman |

(Continued)

FOREIGN PATENT DOCUMENTS

| | | |
|---|---|---|
| CN | 102892678 A | 1/2013 |
| EP | 0329490 A2 | 8/1989 |

(Continued)

OTHER PUBLICATIONS

Indian First Examination Report for Indian App. No. 201317001026, dated Mar. 20, 2020, 3 pages.

(Continued)

*Primary Examiner* — Larry W Thrower
(74) *Attorney, Agent, or Firm* — Barnes & Thornburg LLP

(57) ABSTRACT

A formulation for producing a polymeric material including polypropylene, a chemical blowing agent, and optional components as described.

20 Claims, 1 Drawing Sheet

(56) References Cited

U.S. PATENT DOCUMENTS

| | | |
|---|---|---|
| 2013/0052385 A1 | 2/2013 | Leser |
| 2014/0228498 A1 | 8/2014 | Prince |
| 2014/0272229 A1 | 9/2014 | Xing |
| 2014/0309320 A1 | 10/2014 | Prince |
| 2015/0284521 A1 | 10/2015 | Abubakar |
| 2015/0307679 A1 | 10/2015 | Lee |
| 2016/0257052 A1 | 9/2016 | Sun |

FOREIGN PATENT DOCUMENTS

| | | |
|---|---|---|
| EP | 713481 A1 | 5/1996 |
| EP | 0851805 B1 | 12/1998 |
| EP | 1057608 A2 | 12/2000 |
| EP | 1072389 A1 | 1/2001 |
| EP | 1449634 A1 | 8/2004 |
| JP | 4278340 A | 10/1992 |
| WO | 9504709 | 2/1995 |
| WO | 2012174567 A1 | 12/2012 |

OTHER PUBLICATIONS

First Examination Report for Indian App. No. 201617005271, dated Feb. 11, 2020.
First Examination Report for Indiana Patent App. No. 9302/DELNP/2015 dated May 6, 2019, 7 pages.
Chinese Office Action for Chinese App. No. 20180042446.9 dated Feb. 3, 2018, 9 pages.
Chinese Office Action for Chinese App. No. 20180039581.8 dated Feb. 23, 2018, 13 pages.
Chinese Office Action for Chinese App. No. 201480047978.1 received Feb. 24, 2018, 11 pages.
Chinese Final Rejection for Chinese App. No. 201480047976.2 received on Mar. 7, 2018, 8 pages.
Vasile et al., Practical Guide to Polyethylene, published by Smithers Rapra Press, 2008, p. 119, 3 pages.
Unilever Says It Will Use Less Plastic Per Bottle, Yahoo News (Apr. 22, 2014, 10:20 AM), http://news.yahoo.com/unilever-says-less-plastic-per-bottle-142039401—finance.html (3 pages).
Chinese Office Action for Application Serial No. 201480021009.9, dated Aug. 7, 2017 including English language summary, 12 pages.
Chinese Office Action for Chinese App. No. 201480047976.2 received on Aug. 22, 2017, 15 pages.
Dongwu Yang, Plastic Material Selection Technology, Light Industry Press, Jan. 2008, 1 page.
Chinese Office Action for Chinese App. No. 20180042446.9 dated Oct. 31, 2018, 5 pages.
Chinese Office Action for Chinese App. No. 201480047578.0 dated Jan. 24, 2018, 10 pages.
Chinese Office Action for Application Serial No. 201480021009.9, dated Jan. 2, 2018 including English language summary, 6 pages.
Office Action dated Jan. 17, 2018 for U.S. Appl. No. 15/591,355; (pp. 1-5).
Chinese Office Action for Application Serial No. 201480021009.9, dated Apr. 20, 2018 including English language summary, 6 pages.
First Examination Report for Indiana App. No. 201617007243 dated Dec. 16, 2019, 6 pages.
Office Action dated Jan. 6, 2020, for U.S. Appl. No. 15/902,489, 22 pages.
Chinese Office Action for Chinese App. No. 20180039581.8 dated May 31, 2019, 7 pages.
Chinese Office Action for Chinese App. No. 201480047578.0 dated Aug. 29, 2018, 4 pages.
Office Action dated Apr. 16, 2018 for U.S. Appl. No. 15/061,070, (pp. 1-13).
Definition of "Base," Dictionary.com, available at http://www.dictionary.com/browse/base, retrieved on Apr. 16, 2018.
Office Action dated Apr. 20, 2018 for U.S. Appl. No. 15/239,894, (pp. 1-13).
Office Action dated Apr. 27, 2018 for U.S. Appl. No. 15/061,005 (pp. 1-7).
Office Action dated Jun. 15, 2018 for U.S. Appl. No. 15/491,443, pp. 1-6.
Australian First Patent Examination Report for Australian App. No. 2014311991 dated Oct. 4, 2017, 4 pages.
Office Action dated Oct. 3, 2017 for U.S. Appl. No. 15/491,443; (pp. 1-6).
Office Action dated Oct. 6, 2017 for U.S. Appl. No. 15/383,115; (pp. 1-5).
Office Action dated Oct. 27, 2017 for U.S. Appl. No. 15/239,894; (pp. 1-7).
Office Action dated Sep. 7, 2018 for U.S. Appl. No. 15/239,894, (pp. 1-9).
Lubrizol Advanced Materials, Inc., Extrusion Guide, 2014, 16 pages.
Chinese Office Action for Chinese App. No. 20180039581.8 dated Jan. 14, 2019, 10 pages.
Office Action dated Mar. 8, 2019 for U.S. Appl. No. 15/902,489, (pp. 1-16).
First Substantive Examination Report for European App. No. 14768125.8 dated Mar. 21, 2019, 6 pages.
Office Action dated Jul. 16, 2020 for U.S. Appl. No. 15/902,489, (pp. 1-20).

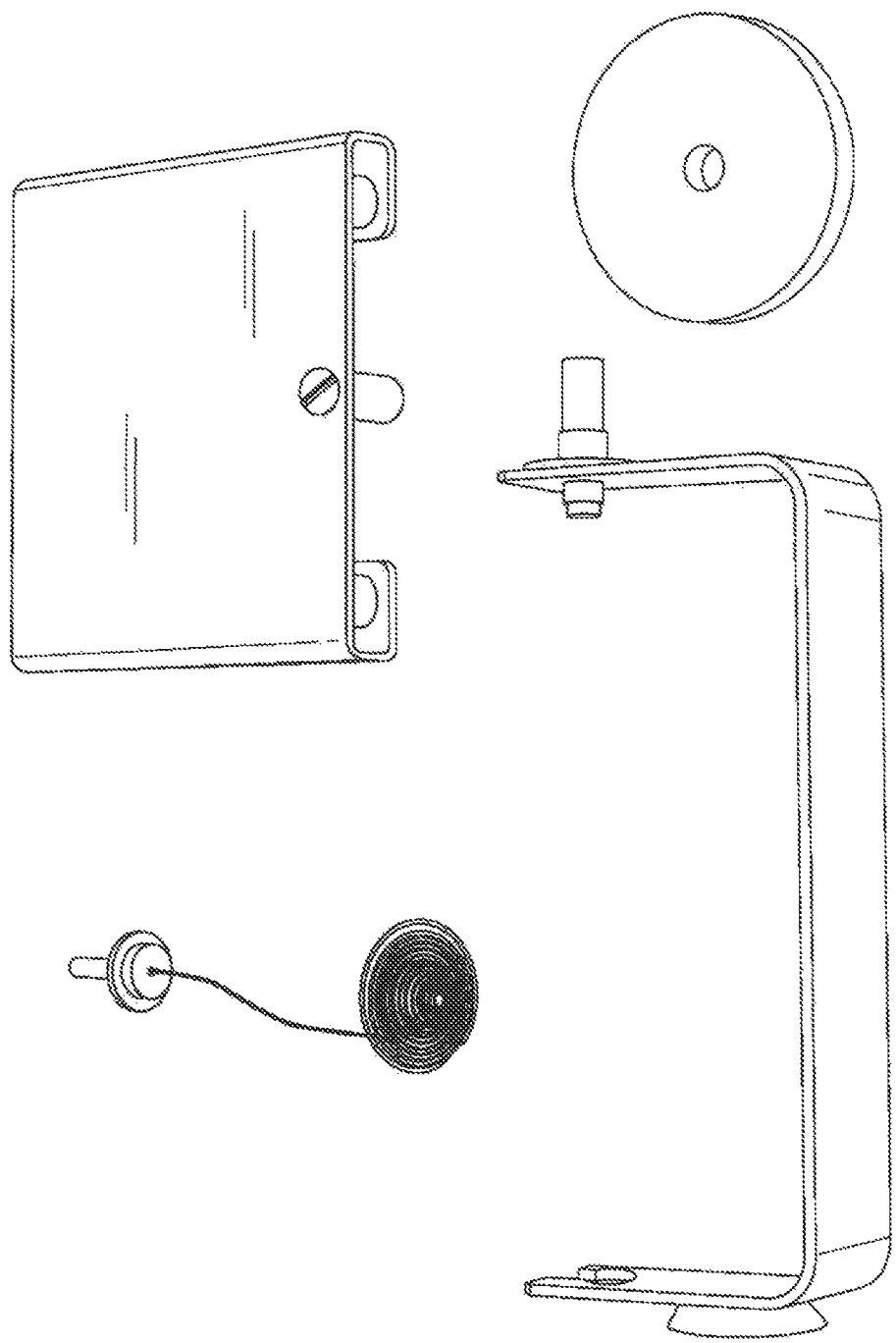

POLYMERIC MATERIAL FOR CONTAINER

PRIORITY CLAIM

This application is a continuation of U.S. application Ser. No. 14/468,789, filed Aug. 26, 2014, which claims priority under 35 U.S.C. § 119(e) to U.S. Provisional Application Ser. No. 61/869,928, filed Aug. 26, 2013, which is expressly incorporated by reference herein.

BACKGROUND

The present disclosure relates to polymeric materials that can be formed to produce a container, and in particular, polymeric materials that insulate. More particularly, the present disclosure relates to polymer-based formulations that can be formed to produce an insulated non-aromatic polymeric material.

SUMMARY

According to the present disclosure, a polymeric material includes a polymeric resin and cell-forming agents. In illustrative embodiments, a blend of polymeric resins and cell-forming agents is mixed and extruded or otherwise formed to produce an insulated non-aromatic polymeric material.

In illustrative embodiments, an insulative cellular non-aromatic polymeric material produced in accordance with the present disclosure can be formed to produce an insulative cup or container. Polypropylene resin is used to form the insulative cellular non-aromatic polymeric material in illustrative embodiments.

In illustrative embodiments, an insulative cellular non-aromatic polymeric material comprises one or more of the following, a polypropylene base resin having high melt strength, polypropylene copolymer or homopolymer, and cell-forming agents. The cell-forming agents include at least one of the following, a chemical nucleating agent and a physical blowing agent.

In illustrative embodiments, a polypropylene-based formulation in accordance with the present disclosure is heated and extruded to produce a tubular extrudate (in an extrusion process) that can be formed to provide a strip of insulative cellular non-aromatic polymeric material. A physical blowing agent in the form of an inert gas is introduced into a molten resin before the tubular extrudate is formed.

In illustrative embodiments, the insulative cellular non-aromatic polymeric material has a density of less than about 0.6 grams per cubic centimeter. In illustrative embodiments, the insulative cellular non-aromatic polymeric material has a density in a range of about 0.2 grams per cubic centimeter to about 0.6 grams per cubic centimeter. In illustrative embodiments, the insulative cellular non-aromatic polymeric material has a density in a range of about 0.3 grams per cubic centimeter to about 0.5 grams per cubic centimeter.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying FIGURE in which:

FIG. 1 is a perspective view of an unassembled density determination apparatus showing the components (clockwise starting in the upper left) gem holder, platform, suspension bracket, and suspension spacer.

DETAILED DESCRIPTION

An insulative cellular non-aromatic polymeric material produced in accordance with the present disclosure can be formed to produce an insulative container such as an insulative cup. As an example, the insulative cellular non-aromatic polymeric material comprises a polypropylene base resin and one or more cell-forming agents. In one illustrative example, the insulative cellular non-aromatic polymeric material is located between and coupled to an inner polymeric layer and an outer polymeric layer to produce a multi-layer tube or multi-layer parison that is blow molded to form an insulative container.

A material-formulation process in accordance with the present disclosure uses a polypropylene-based formulation to produce a strip of insulative cellular non-aromatic polymeric material. The polypropylene-based formulation is heated in an extruder where a cell-forming agent is introduced into the molten formulation prior to extrusion of the materials from the extruder. As the molten materials exit the extruder, cells nucleate in the molten material and the material expands to form the sheet of insulative cellular non-aromatic polymeric material.

In one exemplary embodiment, a formulation used to produce the insulative cellular non-aromatic polymeric material includes at least one polymeric material. The polymeric material may include one or more base resins. In one example, the base resin is polypropylene. In an illustrative embodiment, a base resin can include DAPLOY™ WB140HMS polypropylene homopolymer available from Borealis AG of Vienna, Austria. In another illustrative embodiment, a base resin can include Braskem F020HC polypropylene homopolymer available from Braskem of Philadelphia, Pa. In an embodiment, a base resin can include both DAPLOY™ WB140HMS polypropylene homopolymer and Braskem F020HC polypropylene homopolymer.

In embodiments with more than one polypropylene copolymer base resin, different polypropylene copolymers can be used depending on the attributes desired in the formulation. Depending on the desired characteristics, the ratio of two polypropylene resins may be varied, e.g., 20%/80%, 25%/75%, 30%/70%, 35%/65%, 40%/60%, 45%/55%, 50%/50%, etc. In an embodiment, a formulation includes three polypropylene resins in the base resin. Again, depending on the desired characteristics, the percentage of three polypropylene resins can be varied, 33%/33%/33%, 30%/30%/40%, 25%/25%/50%, etc.

In an illustrative embodiment, a formulation includes one or more base resins. The amount of one or more base resins may be one of several different values or fall within several different ranges. It is within the scope of the present disclosure to select an amount of polypropylene to be one of the following values: about of 85%, 86%, 87%, 88%, 89%, 90%, 91%, 92%, 93%, 94%, 95%, 96%, 97%, 98%, 99%, 99.5%, and 99.9% of the total formulation by weight percentage. In a first set of ranges, the range of polypropylene base resin is one of the following ranges: about 85% to 90%, 85% to 92%, 85% to 95%, 85% to 96%, 85% to 97%, 85% to 98%, 85% to 99%, and 85% to 99.9% of the total formulation by weight percentage. In a second set of ranges, the range of polypropylene base resin is one of the following ranges: about 90 to 99.9%, 92% to 99.9%, 95% to 99.9%, 96% to 99.9%, 97% to 99.9%, 98% to 99.9%, and 99% to 99.9% of the total formulation by weight percentage. In a third set of ranges, the range of polypropylene base resin is one of the following ranges: about 87.5% to 95%, 87.5% to 96%, 95% to 99%, and 96% to 99% of the total formulation by weight percentage. The values and ranges are embodied in Examples 1 to 8.

In an embodiment, an insulative cellular non-aromatic polymeric material includes multiple layers. In an embodiment, a polymeric material as disclosed herein has an outer exterior skin layer in addition to the core layer of at least one base resin. In an embodiment, a polymeric material as disclosed herein has an inner exterior skin layer in addition to the core layer of at least one base resin. In an embodiment, a polymeric material includes both an exterior skin layer and an inner exterior skin layer in addition to the core layer of at least one base resin. In an embodiment, the outer skin layer can be polypropylene or polyethylene. In an embodiment, the inner skin layer can be polypropylene or polyethylene. In an embodiment where a polymeric material includes both an inner and outer skin layer in addition to the core layer of at least one base resin, the inner and outer skin layers can each be independently polypropylene or polyethylene.

In an embodiment, a skin layer comprising polypropylene can be a high stiffness polypropylene. In another illustrative embodiment, a skin layer comprising polypropylene can be a high impact polypropylene. In an embodiment, a skin layer comprising polypropylene can be DOW® D 207.03 developmental performance polypropylene resin. In an embodiment, a skin layer comprising polypropylene can be DOW® DC 7067.00 polypropylene impact copolymer. In an embodiment, an outer, inner, or both outer and inner skin layer can be solid or cellular (i.e., foamed). In an illustrative embodiment, the density of a skin layer (inner and/or outer) can be about 0.9 g/cm$^3$.

In an embodiment, either of the outer or inner skin layer can be a polyethylene. In an illustrative embodiment, the outer skin layer, the inner skin layer, or both the outer and inner skin layer includes a high density ethylene hexane-1 copolymer such as Chevron Phillips MARLEX® HHM 5502 BN.

Long chain branching refers to the presence of polymer side chains (branches) that have a length that is comparable or greater than a length of the backbone to which the polymer side chains are coupled. Long chain branching creates viscoelastic chain entanglements (polymer entanglements) that hamper flow during extensional or oriented stretching and provide for a strain hardening phenomenon. The strain hardening phenomenon may be observed through two analytical methods.

The first analytical method used to observe the presence of strain hardening on an extensional rheometer. During extensional or oriented flow on an extensional rheometer, strain hardening will occur when polymer entanglements do not allow the polymer to flow under Linear Viscoelastic (LVE) conditions. As a result, these polymer entanglements hamper flow and create a deviation from the LVE conditions as observed as a hook formation. The strain hardening phenomenon becomes more severe as strain and strain rate increase due to faster and more severe polymer chain entanglement motion. Virgin polymers without long chain branching will exhibit LVE flow characteristics. In comparison, long chain branched polymers will exhibit strain hardening and which causes a deviation from the LVE flow characteristics of the virgin polymer providing the hook formation under the same test conditions.

The second analytical method used to observe the presence of long chain branching is evaluating melt strength data as tested per ISO 16790 which is incorporated by reference herein in its entirety. An amount of melt strength is known to be directly related to the presence of long chain branching when compared to similar virgin polymers lacking long chain branching. By way of example, Borealis DAPLOY™ WB140HMS Polypropylene (PP) (available from Borealis AG) is compared to other polymers having similar molecular weight, polydispersity index, and other physical characteristics. The DAPLOY™ WB140HMS PP has a melt strength which exceeds about 36 cN while other similar PP resins lacking long chain branching have a melt strength of less than about 10 cN.

The formulation used to produce the insulative cellular non-aromatic polymeric material may further include one or more cell-forming agents. Cell-forming agents include nucleating agents and blowing agents. A nucleating agent is used to provide and control nucleation sites within a molten formulation to promote formation of cells, bubbles, or voids in the molten formulation during extrusion. A blowing agent is used to grow cells in the molten material at nucleation sites. Blowing agents may be used alone in the formulation or with nucleating agents.

Nucleating agent means a chemical or physical material that provides sites for cells to form in a molten formulation mixture. Nucleating agents may include chemical nucleating agents and physical nucleating agents. The nucleating agent may be blended with the formulation that is introduced into the hopper of the extruder. Alternatively, the nucleating agent may be added to the molten resin mixture in the extruder.

Suitable physical nucleating agents have desirable particle size, aspect ratio, and top-cut properties. Examples include, but are not limited to, talc, $CaCO_3$, mica, and mixtures of at least two of the foregoing. One representative example is Heritage Plastics HT6000 Linear Low Density Polyethylene (LLDPE) Based Talc Concentrate.

In an illustrative embodiment, a formulation includes a physical nucleating agent (e.g., talc). The amount of a physical nucleating agent may be one of several different values or fall within several different ranges. It is within the scope of the present disclosure to select an amount of a physical nucleating agent to be one of the following values: about 0%, 0.1%, 0.25%, 0.5%, 0.75%, 1%, 1.5%, 2%, 2.5%, 3%, 4%, 5%, 6%, and 7% of the total formulation by weight percentage. In a first set of ranges, the range of physical nucleating agent is one of the following ranges: about 0% to 7%, 0.1% to 7%, 0.25% to 7%, 0.5% to 7%, 0.75% to 7%, 1% to 7%, 1.5% to 7%, 2% to 7%, 2.5% to 7%, 3% to 7%, 4% to 7%, 5% to 7%, and 6% to 7% of the total formulation by weight percentage. In a second set of ranges, the range of physical nucleating agent is one of the following ranges: about 0% to 6%, 0% to 5%, 0% to 4%, 0% to 3%, 0% to 2.5%, 0% to 2%, 0% to 1.5%, 0% to 1%, 0% to 0.75%, 0% to 0.5%, 0% to 0.25%, and 0% to 0.1% of the total formulation by weight percentage. In a third set of ranges, the range of physical nucleating agent is one of the following ranges: about 0.1% to 6%, 0.1% to 5%, 0.1% to 4%, 0.1% to 3%, 0.1% to 2.5%, 0.1% to 2%, 0.1% to 1.5%, 0.1% to 1%, 0.1% to 0.75%, 0.1% to 0.5%, and 0.1% to 0.25% of the total formulation by weight percentage. The values and ranges are embodied in Examples 1 to 8. In an embodiment, the formulation lacks talc.

Suitable chemical nucleating agents decompose to create cells in the molten formulation when a chemical reaction temperature is reached. These small cells act as nucleation sites for larger cell growth from a physical or other type of blowing agent. In one example, the chemical nucleating agent is citric acid or a citric acid-based material. One representative example is HYDROCEROL™ CF-40E (available from Clariant Corporation), which contains citric acid and a crystal nucleating agent.

In an illustrative embodiment, a formulation includes a nucleating agent. The amount of a nucleating agent may be one of several different values or fall within several different ranges. It is within the scope of the present disclosure to select an amount of a nucleating agent to be one of the following values: about 0.1%, 0.25%, 0.5%, 0.75%, 1%, 1.5%, 2%, 2.5%, 3%, 4%, 5%, 10%, and 15% of the total formulation by weight percentage. In a first set of ranges, the range of nucleating agent is one of the following ranges: about 0.1% to 15%, 0.25% to 15%, 0.5% to 15%, 0.75% to 15%, 1% to 15%, 1.5% to 15%, 2% to 15%, 2.5% to 15%, 3% to 15%, 4% to 15%, 5% to 15%, and 10% to 15% of the total formulation by weight percentage. In a second set of ranges, the range of nucleating agent is one of the following ranges: about 0.1% to 10%, 0.25% to 10%, 0.5% to 10%, 0.75% to 10%, 1% to 10%, 1.5% to 10%, 2% to 10%, 2.5% to 10%, 3% to 10%, 4% to 10%, and 5% to 10% of the total formulation by weight percentage. In a third set of ranges, the range of nucleating agent is one of the following ranges: about 0.1% to 5%, 0.25% to 5%, 0.5% to 5%, 0.75% to 5%, 1% to 5%, 1.5% to 5%, 2% to 5%, 2.5% to 5%, 3% to 5%, and 4% to 5% of the total formulation by weight percentage. The values and ranges are embodied in Examples 1 to 8.

A blowing agent refers to a physical or a chemical material (or combination of materials) that acts to expand nucleation sites. Blowing agents may include chemical blowing agents, physical blowing agents, combinations thereof, or several types of chemical and physical blowing agents. The blowing agent acts to reduce density by forming cells in the molten formulation at the nucleation sites. The blowing agent may be added to the molten resin mixture in the extruder.

Chemical blowing agents are materials that degrade or react to produce a gas. Chemical blowing agents may be endothermic or exothermic. Chemical blowing agents typically degrade at a certain temperature to decompose and release gas. One example of a chemical blowing agent is citric acid or citric-based material. One representative example is HYDROCEROL™ CF-40E (available from Clariant Corporation), which contains citric acid and a crystal nucleating agent. Here, the citric acid decomposes at the appropriate temperature in the molten formulation and forms a gas which migrates toward the nucleation sites and grows cells in the molten formulation. If sufficient chemical blowing agent is present, the chemical blowing agent may act as both the nucleating agent and the blowing agent.

In another example, chemical blowing agents may be selected from the group consisting of azodicarbonamide; azodiisobutyro-nitrile; benzenesulfonhydrazide; 4,4-oxybenzene sulfonylsemicarbazide; p-toluene sulfonyl semicarbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoro ethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; p-toluene sulfonyl azide, and combinations thereof.

In one aspect of the present disclosure, where a chemical blowing agent is used, the chemical blowing agent may be introduced into the material formulation that is added to the hopper.

One example of a physical blowing agent is nitrogen ($N_2$). The $N_2$ is pumped into the molten formulation via a port in the extruder as a supercritical fluid. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, or air. Physical blowing agents may also include mixtures of alkanes such as, but not limited to, pentane, butane, and the like. In an illustrative example, a physical blowing agent may be introduced at a rate of about 0.07 pounds per hour to about 0.1 pounds per hour. In another illustrative example, the physical blowing agent may be introduced at a rate of about 0.74 pounds per hour to about 0.1 pounds per hour. In another illustrative example, the physical blowing agent may be introduced at a rate of about 0.75 to about 0.1 pounds per hour.

In one aspect of the present disclosure, at least one slip agent may be incorporated into the formulation to aid in increasing production rates. Slip agent (also known as a process aid) is a term used to describe a general class of materials which are added to the formulation and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated C-18) through erucyl (C-22 single unsaturated) may be used. Other representative examples of slip agent materials include low molecular weight amides and fluoroelastomers. Combinations of two or more slip agents can be used. Slip agents may be provided in a master batch pellet form and blended with the resin formulation. One example of a slip agent is commercially available as AMPACET™ 102109 Slip PE MB. Another example of a slip agent that is commercially available is AMAPACET™ 102823 Process Aid PE MB.

In an illustrative embodiment, a formulation includes a slip agent. The amount of a slip agent may be one of several different values or fall within several different ranges. It is within the scope of the present disclosure to select an amount of a slip agent to be one of the following values: about 0%, 0.1%, 0.25%, 0.5%, 0.75%, 1%, 1.5%, 2%, 2.5%, and 3% of the total formulation by weight percentage. In a first set of ranges, the range of slip agent is one of the following ranges: about 0% to 3%, 0.1% to 3%, 0.25% to 3%, 0.5% to 3%, 0.75% to 3%, 1% to 3%, 1.5% to 3%, 2% to 3%, and 2.5% to 3% of the total formulation by weight percentage. In a second set of ranges, the range of slip agent is one of the following ranges: about 0% to 2.5%, 0% to 2%, 0% to 1.5%, 0% to 1%, 0% to 0.75%, 0% to 0.5%, 0% to 0.25%, and 0% to 0.1% of the total formulation by weight percentage. In a third set of ranges, the range of slip agent is one of the following ranges: about 0.1% to 2.5%, 0.1% to 2%, 0.1% to 1.5%, 0.1% to 1%, 0.1% to 0.75%, 0.1% to 0.5%, and 0.1% to 0.25% of the total formulation by weight percentage. The values and ranges are embodied in Examples 1 to 8. In an embodiment, the formulation lacks a slip agent.

In another aspect of the present disclosure, an impact modifier may be incorporated into the formulation to minimize fracturing of the insulative cellular non-aromatic polymeric material when subjected to an impact such as a drop test. One representative example of a suitable impact modifier is DOW® AFFINITY™ PL 1880G polyolefin plastomer.

In an illustrative embodiment, a formulation includes a colorant. The amount of a colorant may be one of several different values or fall within several different ranges. It is within the scope of the present disclosure to select an amount of a colorant to be one of the following values: about 0%, 0.1%, 0.25%, 0.5%, 0.75%, 1%, 1.5%, 2%, 2.5%, 3%, and 4% of the total formulation by weight percentage. In a first set of ranges, the range of colorant is one of the following ranges: about 0% to 4%, 0.1% to 4%, 0.25% to 4%, 0.5% to 4%, 0.75% to 4%, 1% to 4%, 1.5% to 4%, 2% to 4%, 2.5% to 4%, and 3% to 4% of the total formulation by weight percentage. In a second set of ranges, the range of colorant is one of the following ranges: about 0% to 3%, 0% to 2.5%, 0% to 2%, 0% to 1.5%, 0% to 1%, 0% to 0.75%, 0% to 0.5%, 0% to 0.25%, and 0% to 0.1% of the total formulation by weight percentage. In a third set of ranges, the range of colorant is one of the following ranges: about 0.1% to 2.5%, 0.1% to 2%, 0.1% to 1.5%, 0.1% to 1%, 0.1% to 0.75%, 0.1% to 0.5%, and 0.1% to 0.25% of the total formulation by weight percentage. The values and ranges are embodied in Examples 1 to 8. In an embodiment, the formulation lacks a colorant.

One or more additional components and additives optionally may be incorporated, such as, but not limited to, colorants (such as, but not limited to, titanium dioxide), and compound regrind.

In an embodiment, the insulative cellular non-aromatic polymeric material is located between and coupled to an inner polymeric layer and an outer polymeric layer to produce a multi-layer tube. For example, the multi-layer tube can be a bottle. In an embodiment, the insulative cellular non-aromatic polymeric material is located between and coupled to an inner polymeric layer and an outer polymeric layer to produce a multi-layer tube. For example, the multi-layer tube can be a bottle. It is within the scope of the present disclosure to select a bottle density to be one of the following values: about 0.5, 0.6, 0.65, 0.7, 0.75, 0.8, 0.9, 0.92, and 1 g/cm$^3$. In a first set of ranges, the range of density is one of the following ranges: about 0.5 to 0.92, 0.6 to 0.92, 0.7 to 0.92, 0.75 to 0.92, 0.8 to 0.92, and 0.5 to 1 g/cm$^3$ of the total formulation by weight percentage. In a second set of ranges, the range of density is one of the following ranges: about 0.5 to 0.9, 0.6 to 0.9, 0.7 to 0.9, 0.75 to 0.9, and 0.8 to 0.9 g/cm$^3$ of the total formulation by weight percentage. In a third set of ranges, the range of density is one of the following ranges: about 0.7 to 0.85, 0.7 to about 0.8, 0.72 to about 0.85, and 0.75 to 0.85 g/cm$^3$ of the total formulation by weight percentage. Density was determined according to the density test procedure outlined in Example 8.

In an embodiment, the insulative cellular non-aromatic polymeric material is located between and coupled to an inner polymeric layer and an outer polymeric layer to produce a multi-layer parison. It is within the scope of the present disclosure to select a multi-layer parison to be one of the following values: about 0.4, 0.45, 0.5, 0.55, 0.6, 0.65, 0.7, 0.75, and g/cm$^3$. In a first set of ranges, the range of density is one of the following ranges: about 0.4 to 0.8, 0.45 to 0.8, 0.5 to 0.8, 0.55 to 0.8, 0.6 to 0.8, 0.65 to 0.8, 0.7 to 0.8, and 0.75 to 0.8 g/cm$^3$ of the total formulation by weight percentage. In a second set of ranges, the range of density is one of the following ranges: about 0.4 to 0.7, 0.45 to 0.7, 0.5 to 0.7, 0.55 to 0.7, 0.6 to 0.7, and 0.65 to 0.7 g/cm$^3$ of the total formulation by weight percentage. In a third set of ranges, the range of density is one of the following ranges: about 0.4 to 0.6, 0.5 to 0.6, and 0.4 to 0.5 g/cm$^3$ of the total formulation by weight percentage. Density was determined according to the density test procedure outlined in Example 8.

Before the drop test is performed, the insulative cellular non-aromatic polymeric material is coupled and located between two polymeric layers to form a multi-layer parison. The multi-layer parison is then formed, for example, via blow molding into a container. The resulting container is then tested according to one of the Plastic Bottle Institute Test for Drop Impact Resistance of Plastic Bottles, PBI 4-1968, Rev. 2-1988 test method and the Rigid Plastics Container Division of the The Society of Plastics Industry, Inc. RPCD-7-1991 test method.

In another example, the drop test may be performed according to the following procedure. The container is filled with water and closed off with, for example, a lid. The sample container is then held at about 73 degrees Fahrenheit (22.8 degrees Celsius) and about 50% relative humidity. The filled, capped containers are then subjected to the following procedure: (a) the filled, capped container is located at about five feet above a hard surface such as concrete or tile; (b) the filled, capped container is then oriented such that a bottom of the filled, capped container is arranged to lie in a substantially parallel relation to the hard surface; (c) each of ten capped, filled containers are dropped; (d) upon impact, each filled, capped container is examined for any break or shattering of the wall that causes water to leak out of the bottle; and (d) the total number of bottles showing any sign of leakage after the drop test are counted as failures.

According to an aspect of the present disclosure, there is provided a method of forming a multi-later parison formed from insulative cellular non-aromatic polymeric material, the method comprising the steps of:

a) heating, to a molten state, a mixture comprising:
at least 85% (w/w) of at least one polypropylene base resin;
0-15% (w/w) of at least one chemical nucleating agent; and
0-3% (w/w) of a slip agent;
b) injecting a blowing agent into the molten mixture;
c) extruding the molten mixture resulting from step b) to form a core layer, wherein said mixture is co-extruded with an outer skin layer to form a multi-layer parison.

The core layer and outer skin layer forming the multi-layer parison are disposed one directly on top of the other, in the sense that the core layer and outer skin layers are coupled to one another.

In an embodiment, step c) is performed without the use of a tandem extruder arrangement.

In another embodiment, step c) comprises extruding the molten mixture resulting from step b) to form a core layer, wherein said mixture is co-extruded with an outer skin layer and an inner skin layer to form a multi-layer parison. Where the multi-layer parison comprises both outer and inner skin layers, it will be understood that the core layer is disposed between said outer an inner skin layers, such that a first surface of the core layer is coupled to the outer skin layer, and a second surface of the core layer opposite the said first surface is coupled to said inner skin layer.

In another embodiment, step c) further comprises co-extruding any number of additional layers with the core layer and the outer skin layer.

In another embodiment, the outer and inner skin layers each comprise polypropylene or polyethylene.

In one example, the polypropylene used in either of the skin layers is a high stiffness polypropylene. In another example, the polypropylene used in either of the skin layers is a high impact polypropylene. In another example, the polypropylene used in either of the skin layers is DOW® D 207.03 developmental performance polypropylene resin or DOW® DC 7067.00 polypropylene impact copolymer.

In one example, the polyethylene used in either of the skin layers is a high density ethylene hexane-1 copolymer. In another example, the polyethylene used in either of the skin layers is Chevron Phillips MARLEX® HHM 5502 BN.

In one example, both of the outer and inner skin layers are a formed from a polypropylene selected from DOW® D 207.03 developmental performance polypropylene resin or DOW® DC 7067.00 polypropylene impact copolymer.

In example, the mixture of step a) is
79-82% (w/w) of a first polypropylene homopolymer;
14-16% (w/w) of a second polypropylene homopolymer;
0.01-1.5% (w/w) of a chemical nucleating agent;
1-3% (w/w) of a slip agent; and
0.1-1% (w/w) of a physical nucleating agent.

In another embodiment, the method further comprises a step d) of blow-molding the multi-layer parison resulting from step c) to provide a container formed from insulative cellular non-aromatic polymeric material.

According to another aspect of the present disclosure, there is provided a method of forming a multi-later parison formed from insulative cellular non-aromatic polymeric material, the method comprising the steps of:
a) heating, to a molten state, a mixture comprising:
at least 85% (w/w) of at least one polypropylene base resin;
0-15% (w/w) of at least one chemical nucleating agent; and
0-3% (w/w) of a slip agent;
b) injecting a blowing agent into the molten mixture;
c) extruding the molten mixture resulting from step b) to form a core layer, wherein said mixture is co-extruded with an outer skin layer to form a multi-layer parison; and
d) blow-molding the multi-layer parison resulting from step c) to provide a container formed from insulative cellular non-aromatic polymeric material.

According to another aspect of the present disclosure, there is provided a multi-layer parison obtainable, obtained, or directly obtained by a process defined herein.

According to another aspect of the present invention, there is provided a container obtainable, obtained, or directly obtained by a process defined herein.

Example 1

Formulation and Extrusion

In the mono-layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 81.4% | Borealis WB140 HMS polypropylene homopolymer |
| 15% | Braskem F020HC polypropylene homopolymer |
| 0.1% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture.

The $N_2$ was injected at about 0.0751 lbs/hr and about 0.0750 lbs/hr into the resin blend to expand the resin and reduce density. The mixture thus formed was extruded through a die head into a parison. The parison was then blow molded with air to form a container.

Containers were formed from a monolayer tube. A monolayer tube used to form insulative cellular non-aromatic polymeric bottle had a density of about 0.670 grams per cubic centimeter when both about 0.0751 lbs/hr and about 0.0750 lbs/hr of $N_2$ were added to the molten resin mixture.

Example 2

Formulation and Extrusion

In a core layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 81.45% | Borealis WB140 HMS polypropylene homopolymer |
| 15% | Braskem F020HC polypropylene homopolymer |
| 0.05% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture. The $N_2$ was injected at about 0.075 lbs/hr into the resin blend to expand the resin and reduce density.

The mixture thus formed was communicated to a co-extrusion die where the mixture was extruded to form a core layer along with an outer skin layer to establish a multi-layer parison. The multi-layer parison was then blow molded with air to form a container. In one example, the outer skin comprises a polypropylene resin. In another example, the outer skin was comprised of DOW® DC 7067.00 polypropylene impact copolymer.

The multi-layer parison was then blow molded to form an insulative cellular non-aromatic polymeric bottle which had a bottle density of about 0.7 grams per cubic centimeter and the core layer had a density of about 0.665 grams per cubic centimeter.

Example 3

Formulation and Extrusion

In a core layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 81.45% | Borealis WB140 HMS polypropylene homopolymer |
| 15% | Braskem F020HC polypropylene homopolymer |
| 0.05% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture. The $N_2$ was injected at about 0.074 lbs/hr into the resin blend to expand the resin and reduce density.

The mixture thus formed was communicated to a co-extrusion die where the mixture was extruded to form a core layer located between an outer skin layer and an inner skin layer to establish a multi-layer parison. The multi-layer parison was then blow molded with air to form a container. In one example, both the outer skin and the inner skin comprise a polypropylene resin. In another example, the outer skin was comprised of DOW® DC 7067.00 polypropylene impact copolymer and the inner skin was comprised of DOW® PP D207.03 developmental performance polypropylene resin.

The multi-layer parison was then blow molded to form an insulative cellular non-aromatic polymeric bottle which had a bottle density of about 0.71 grams per cubic centimeter when and the core layer had a density of about 0.677 grams per cubic centimeter.

Example 4

Formulation and Extrusion

In a core layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 81% | Borealis WB140 HMS polypropylene homopolymer |
| 15% | Braskem F020HC polypropylene homopolymer |
| 0.5% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture. The $N_2$ was injected at about 0.074 lbs/hr into the resin blend to expand the resin and reduce density.

The mixture thus formed was communicated to a co-extrusion die where the mixture was extruded to form a core layer located between an outer skin layer and an inner skin layer to establish a multi-layer parison. The multi-layer parison was then blow molded with air to form a container. In one example, both the outer skin and the inner skin comprise a polypropylene resin. In another example, the outer skin was comprised of DOW® DC 7067.00 polypropylene impact copolymer and the inner skin was comprised of DOW® PP D207.03 developmental performance polypropylene resin.

The multi-layer parison was then blow molded to form an insulative cellular non-aromatic polymeric bottle which had a bottle density of about 0.69 grams per cubic centimeter when and the core layer had a density of about 0.654 grams per cubic centimeter.

Example 5

Formulation and Extrusion

In a core layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 81% | Borealis WB140 HMS polypropylene homopolymer |
| 15% | Braskem F020HC polypropylene homopolymer |
| 0.5% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture. The $N_2$ was injected at about 0.1 lbs/hr into the resin blend to expand the resin and reduce density.

The mixture thus formed was communicated to a co-extrusion die where the mixture was extruded to form a core layer located between an outer skin layer and an inner skin layer to establish a multi-layer parison. The multi-layer parison was then blow molded with air to form a container. In one example, both the outer skin and the inner skin comprise a polypropylene resin. In another example, the outer skin was comprised of DOW® DC 7067.00 polypropylene impact copolymer and the inner skin was comprised of DOW® PP D207.03 developmental performance polypropylene resin.

The multi-layer parison was then blow molded to form an insulative cellular non-aromatic polymeric bottle which had a bottle density of about 0.53 grams per cubic centimeter when and the core layer had a density of about 0.472 grams per cubic centimeter.

Example 6

Formulation and Extrusion

In a core layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 80.5% | Borealis WB140 HMS polypropylene homopolymer |
| 15% | Braskem F020HC polypropylene homopolymer |
| 1.0% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture. The $N_2$ was injected at about 0.1 lbs/hr into the resin blend to expand the resin and reduce density.

The mixture thus formed was communicated to a co-extrusion die where the mixture was extruded to form a core layer located between an outer skin layer and an inner skin layer to establish a multi-layer parison. The multi-layer parison was then blow molded with air to form a container. In one example, both the outer skin and the inner skin comprise a polypropylene resin. In another example, the outer skin was comprised of DOW® DC 7067.00 polypropylene impact copolymer and the inner skin was comprised of DOW® PP D207.03 developmental performance polypropylene resin.

In one example, the multi-layer parison was then blow molded to form an insulative cellular non-aromatic polymeric bottle which had a bottle density of about 0.49 grams per cubic centimeter when and the core layer had a density of about 0.427 grams per cubic centimeter. In another example, the multi-layer parison was then blow molded to form an insulative cellular non-aromatic polymeric bottle which had a bottle density of about 0.54 grams per cubic centimeter and the core layer had a density of about 0.483 grams per cubic centimeter.

Example 7

Formulation and Extrusion

In a core layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 80.5% | Borealis WB140 HMS polypropylene homopolymer |
| 15% | Braskem F020HC polypropylene homopolymer |
| 1.0% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture. The $N_2$ was injected at about 0.1 lbs/hr into the resin blend to expand the resin and reduce density.

The mixture thus formed was communicated to a co-extrusion die where the mixture was extruded to form a core layer located between an outer skin layer and an inner skin layer to establish a multi-layer parison. The multi-layer parison was then blow molded with air to form a container. In one example, both the outer skin and the inner skin comprise a polyethylene resin. In another example, both the outer skin and the inner skin were comprised of high density ethylene hexane-1 copolymer (Chevron Phillips Marlex® HHM 5502 BN).

In one example, multi-layer parison was then blow molded to form an insulative cellular non-aromatic polymeric bottle which had a bottle density of about 0.49 grams per cubic centimeter when and the core layer had a density of about 0.427 grams per cubic centimeter.

Example 8

Density Measurements

This Example demonstrates the test used to measure the density of filled and unfilled polymer parts.

Procedure

The density was determined by the apparatus shown, unassembled, in FIG. 1. Although not shown in FIG. 1, the apparatus also included a thermometer to measure the suspension liquid temperature. A suspension liquid is a fluid with a density lower than that of the sample to be measured. The sample must sink in the suspension fluid to determine the sample density. Water has a density of 1 g/cm3, so most unfilled polymers require some other suspension fluid such as isopropyl alcohol, density=0.8808 g/cm3. A Mettler AT400 balance (Mettler-Toledo LLC, Columbus, Ohio) was also used.

The density of a limestone-filled HDPE bottle was measured. After taring the balance to zero, the dry solid sample was weighed after placing it in the cup of the Mettler balance. The dry weight was 0.3833 g. After weighing the dry sample and before removing the sample from the cup, the balance was tared again. The sample was removed from the cup and placed on the gem holder in the suspension fluid. The sample was weighed providing the weight with a negative number (−0.3287 g). The number was converted to its absolute value (0.3287 g); the positive value is the sample buoyancy. The sample density was calculated by multiplying the dry weight (0.3833 g) by the sample buoyancy (0.3287 g) by the suspension fluid density (0.8808 g/cc), which equaled 1.0272 g/cc.

The invention claimed is:

1. A method of forming an insulative cellular non-aromatic polymeric container comprising the steps of
   heating a mixture of
   at least 85% (w/w) of at least one polypropylene base resin, up to about 15% (w/w) of at least one nucleating agent, and injecting a blowing agent into the mixture, extruding the mixture to form a core layer, extruding a skin layer on the core layer to establish a multi-layer parison, and blow molding the multi-layer parison with air to form an insulative cellular non-aromatic container, wherein the multi-layer parison has a density of about 0.4 g/cm$^3$ to about 0.8 g/cm$^3$.

2. The method of claim 1, wherein the polypropylene base resin is a polypropylene copolymer.

3. The method of claim 1, wherein the polypropylene base resin is a polypropylene homopolymer.

4. The method of claim 1, wherein the polypropylene base resin is at least one a polypropylene copolymer, a polypropylene homopolymer, or mixtures thereof.

5. The method of claim 4, wherein the at least one polypropylene base resin is about 90% to 99.9%.

6. The method of claim 5, wherein the at least one polypropylene base resin is about 95% to 99.9%.

7. The method of claim 5, wherein the at least one nucleating agent is about 0.1% to 5%.

8. The method of claim 7, wherein the at least one nucleating agent is about 0.5% to 5%.

9. The method of claim 7, wherein the blow agent is injected into the mixture at about 0.075, 0.1, or 0.75 lbs/hr.

10. The method of claim 1, wherein the mixture further comprises up to about 3% (w/w) of a slip agent.

11. The method of claim 10, wherein the slip agent is about 1% to 3%.

12. The method of claim 11, wherein the slip agent is about 2%.

13. The method of claim 1, wherein the at least one polypropylene base resin is two polypropylene base resins.

14. The method of claim 13, wherein the ratio of the two polypropylene base resins is 50% to 50%.

15. The method of claim 1, wherein the skin layer is a solid layer.

16. The method of claim 15, wherein the skin layer has a density of about 0.9 g/cm$^3$.

17. The method of claim 1, further comprising the step of extruding a second skin layer on the core layer and the skin layer.

18. The method of claim 1, wherein the density of the container is about 0.5 g/cm$^3$ to about 1 g/cm$^3$.

19. A method of forming an insulative cellular non-aromatic polymeric container comprising the steps of heating a mixture of at least 85% (w/w) of at least one polypropylene resin, up to about 15% (w/w) of at least one nucleating agent, and injecting a blowing agent into the mixture, extruding the mixture to form a core layer, extruding a skin layer on the core layer to establish a multi-layer structure, and using the multi-layer structure to form an insulative cellular non-aromatic container, wherein the multi-layer structure has a density of about 0.4 g/cm$^3$ to about 0.8 g/cm$^3$.

20. The method of claim 19, wherein the using step is a molding step.

* * * * *